Feb. 9, 1971            G. W. RUCK            3,561,290
POSITIVE DRIVE LINEALLY VARIABLE SPEED DEVICE
Filed April 14, 1969            2 Sheets-Sheet 1
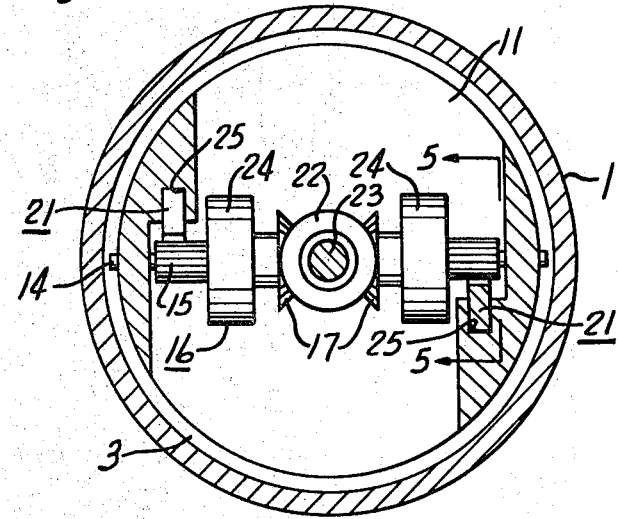
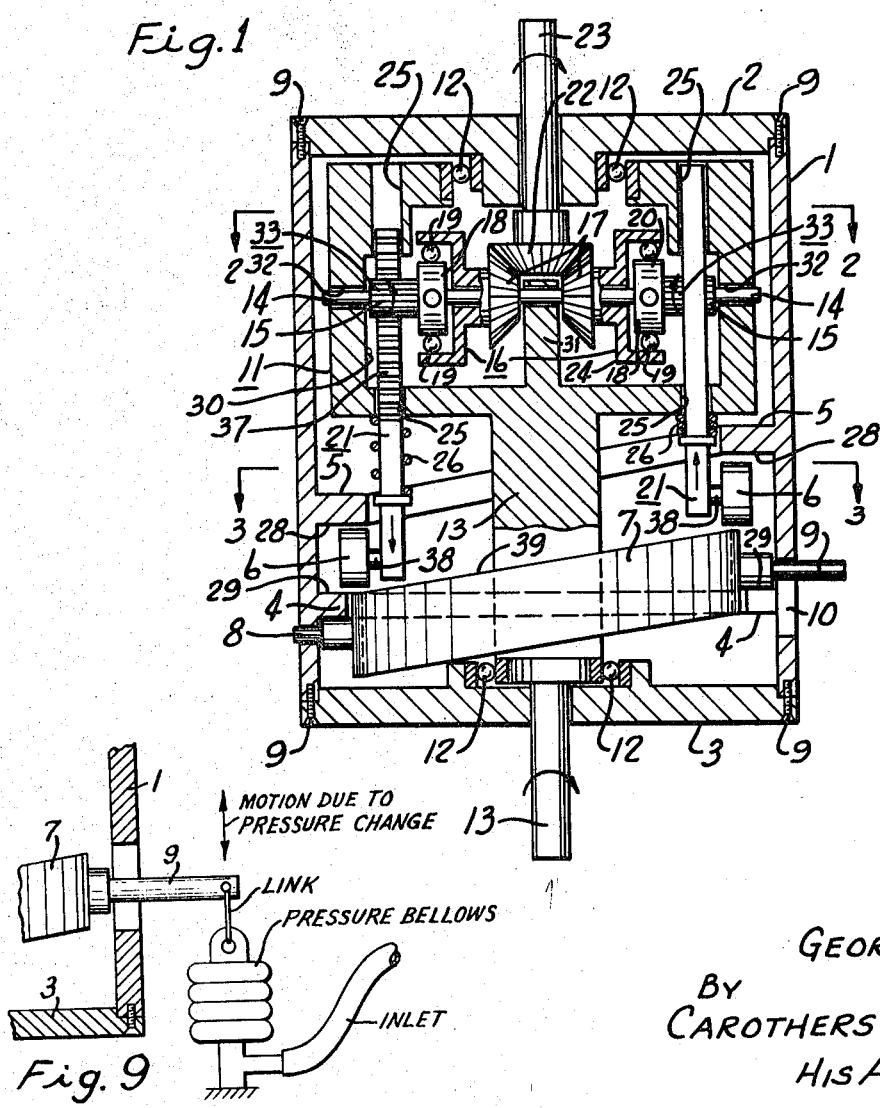
INVENTOR.
GEORGE W. RUCK
BY
CAROTHERS & CAROTHERS
HIS ATTORNEYS

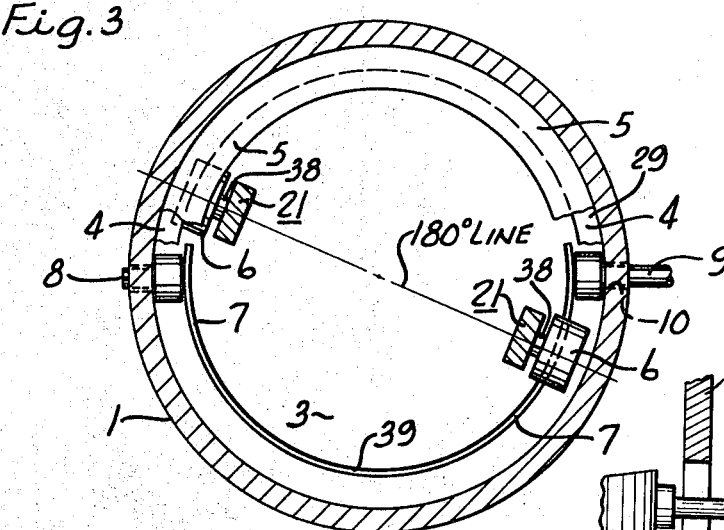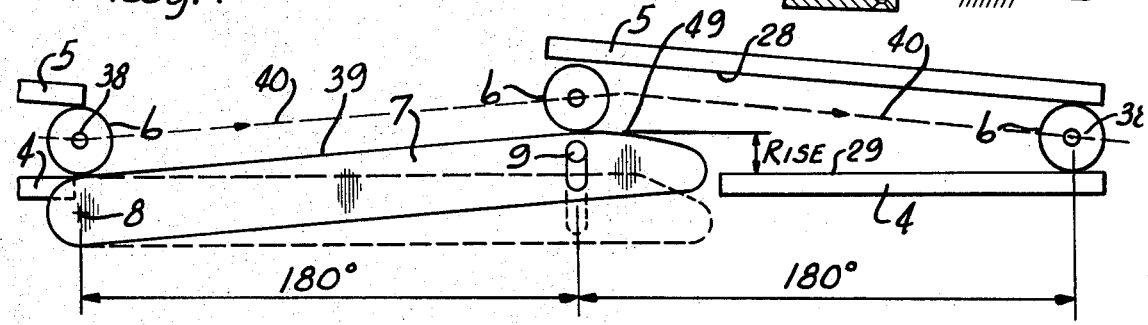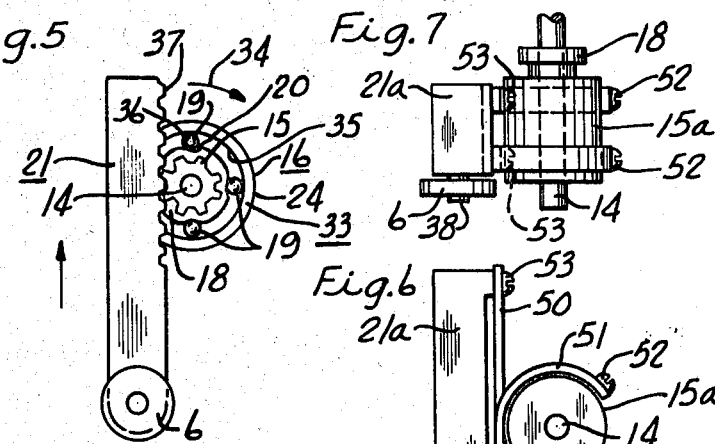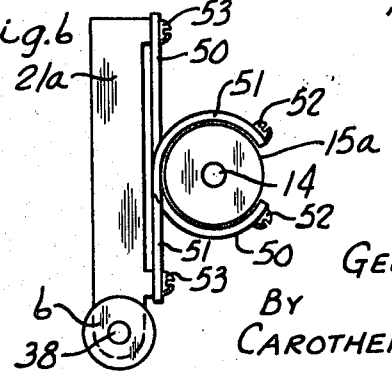

United States Patent Office 3,561,290
Patented Feb. 9, 1971

3,561,290
POSITIVE DRIVE LINEALLY VARIABLE SPEED DEVICE
George W. Ruck, 5435 Park Ave.,
Bethel Park, Pa. 15102
Filed Apr. 14, 1969, Ser. No. 815,871
Int. Cl. F16h *35/02, 37/00*
U.S. Cl. 74—679
15 Claims

ABSTRACT OF THE DISCLOSURE

An axial shaft planetary gear type, lineally variable speed device, the sun meshed planet gears of which are each independent and rotatably supported through a connecting clutch by their respective rack operated pinion, the stroke of the rack of which varies the speed of the output shaft over that of the input shaft. A shaft means transverse of the axial input and output shafts of the transmission is provided and is independently rotatably supporting the planet gears with their respective clutches and pinions, the latter driven by their respective racks movable parallel relative to the rotary aligned axis of the device and carrying antifriction followers engaged by a track means adjustably movable axially to obtain variable speeds over the one-to-one ratio of the speed device. The use of the transverse shaft in the rotary planetary system simplifies the structure by permitting the use of parallel aligned racks rotatable about the central axis of the device and having followers to engage the track means and produce a straight line speed variation. It is not a sinusoidal relation. This is important in many uses of this type of device in power transmission.

PRIOR ART REFERENCES

| Tornberg | 1,732,247 | 74–679 |
| Rayburn | 1,807,013 | 74–681 |
| Rayburn | 1,840,871 | 74–681 |
| Eggert | 1,869,189 | 74–123 |
| Ewart | 2,178,784 | 74–679 |
| Marco | 2,387,401 | 74–679 |
| Osborne | 2,417,944 | 74–679 |
| Neukvich | 2,883,882 | 74–679 |

The principal aim of these prior art disclosures is to obtain a variable speed power transmission or speed device by driving the planet gears to increase the output shaft versus the input shaft over that of a one-to-one ratio. Some employ the wobble type rack drive and others the rotary cam type drive. Some seek to avoid sinusoidal variations in their rack by various means to obtain a straight line variable relation of speed in the selected control involved. This is demonstrated in Neukvich, 2,883,882, which includes considerably more structural elements in attempting to accomplish the lineal variable speed that is readily obtained by the simplified structure comprising the present invention.

SUMMARY OF INVENTION

The positive drive lineally variable speed device of this invention changes the output speed by adjusting the slope or rise of an adjustable helix. The change in output is linear and proportional to the change in the slope of the helix. The unit is a positive gear driven device which can be adjusted while in operation.

Because the unit is a positive drive lineally variable speed device it has application for varying the output speed on heavy machinery, as a variable transmission in the automotive industry, and in the instrumentation industry where a linear and infinitely variable output is required to match a proportional speed change adjustment. It also has an important application in the field of liquid and gas measuring meters where the gas volume is constantly changing with temperature and pressure. The device comprising this invention can be provided in such meters as a servo tool to maintain a uniform volume supply of gas per unit time regardless of changes in atmosperic temperature or line pressure.

The following equation dramatizes the ratio relationship of output in revolutions over input in revolutions for a given situation where, $$R_{\text{out}} = R_{\text{in}}\left[1 + 2\left(\frac{SDP}{\pi N_{\text{p}}} \times \frac{N_{\text{bi}}}{N_{\text{bo}}}\right)\right]$$

and where:

R=revolutions
S=rise of helix in 180°
DP=diametral pitch of the pinion gear
$N_p$=number of teeth in the pinion gear
$N_{bi}$=number of teeth in the bevel gears driven by the racks
$N_{bo}$=number of teeth in the bevel sun gear secured to the output shaft.

The rotational output is equal to the rotational input when the rise of the helix is zero whereas the maximum output is directly proportional to the maximum rise of the helix. Variable outputs therebetween are lineal relative to the movement of the helix from its zero position to a maximum position. It will be further noted that the range of the output is dependent on the number of teeth in the rack drive bevel gears and the driven bevel gear and that the sensitivity, as far as variable speed is concerned, of the helix adjustment is dependent on the number of teeth in the pinion gears.

The principal object of this invention is the provision of an improved and simplified lineally variable speed device that provides a non-rotary helical guide track at the end of a rotary planetary system, within an enclosure, to be engaged by rack followers to vary the output of the device in an infinite number of lineal degrees.

The physical size of the variable speed transmission is determined by the torque which the unit is to transmit. The structural components always being similar but strengthened accordingly to sustain the torque requirements.

With only two planetary gears, only one shaft transverse relative to the rotary input and output axis is needed. Only one helix need be employed to extend through 180° and thus is semicircular in shape with a return fixed track for the remaining 180° to complete the circular track way which guides the axial aligned movement of the racks.

Another object of the present invention is the provision of gear racks operated by the rack followers traveling along the helical guide track. The linear motion of the racks is transferred into rotary motion to be imposed upon the planet gears when the gear racks are raised to their extended position in the housing of the lineally variable speed device.

A detent clutch is employed to transfer the lineal motion of the gear racks to the planet gears. The detent clutches operate to transfer such rotary motion only when the gear racks are raised in their extended position. The return or downward motion of the gear racks disengages the detent clutches so that no rotary motion is transferred to the planetary gears.

Although a detent clutch is preferred to perform this mechanical operation, obviously other mechanical arrangements may be employed for providing this unidirectional rotary motion. An example would be a pawl and ratchet arrangement.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 1 is a view in longitudinal section along the rotary axis of the positive drive lineally variable speed device comprising this invention.

FIG. 2 is a transverse sectional view taken on the line 2—2 of FIG. 1.

FIG. 3 is a transverse sectional view taken on the line 3—3 of FIG. 1.

FIG. 4 is a diagrammatic lineal layout of the track guides to more clearly particularize their operation in the lineally variable speed device.

FIG. 5 is a detailed view along the line 5—5 of FIG. 2 showing a rack pinion and clutch arrangement of the lineally variable speed device.

FIG. 6 is an alternate arrangement for the gear rack of FIG. 5.

FIG. 7 is a plan view of FIG. 6.

FIG. 8 is a schematic view of thermal responsive means for operating the positive drive lineally variable speed device comprising this invention.

FIG. 9 is a schematic view of fluid flow responsive means for operating the positive drive lineally variable speed device comprising this invention.

Referring to the drawings and particularly to FIG. 1 the lineally variable speed device, which is also referred to as a power type transmission, is retained in the cylindrical member or enclosure 1 the opposite ends of which are capped by the removable end plates or heads 2 and 3 secured to the cylindrical enclosure by means of the screws 9.

An arcuate roller guide or track means 4 may be formed integral or attached otherwise for 180° within the bore of the cylinder 1. The track surface of this roller guide 4 lies in a single transverse, substantially normal, plane relative the rotary axis of the transmission, as indicated in dotted lines in FIG. 1 and also shown in FIG. 4.

The biasing or return roller guide or track means 5 is helical and provides a downwardly sloping under-track surface 28 spaced from the track means 4 and substantially coextensive therewith being slightly longer than 180°. The spacing between the guides 4 and 5 is determined by the size of the two followers or rollers 6. The roller or follower 6 has clearance between the guides 4 and 5 as shown at opposite ends of the lineal layout view of FIG. 4. The under-track surface 28 of the spiral roller or follower guide 5 merely moves the guides or followers down again to the top rack surface 29 of the guide or track means 4.

That section of the track means 4 that is fixed to the bore of the cylinder 1 has a counter part movable roller track means 7 that extends between and overlaps the ends of the track means 4. It is the positive stroke track means as shown in FIGS. 1, 3, and 4. The adjustable roller track means 7 is preferably a flexible segmentary arcuate member secured at one end to the pivot block member 8 and at its other end is secured to the operating pin or post 9 that extends through the axially disposed slot 10 as indicated in FIGS. 1 and 3. To invision the movement form of flexible arcuate member 7 within the power transmission, a good illustration is a flat strip tempered coil spring commonly found in wind-up devices, the ends of which when moved in opposite axial directions or otherwise deflected axially causes the spring to take a uniform helical shape.

As shown in full lines in FIGS. 1 and 4 this flexible helix is set at its maximum inclination which would result in the greatest or highest speed output in the power transmission. The higher the slope of this inclination, the faster the developed output speed. Such speeds can, of course, be varied by ordinary gear type transmissions attached in series with the input or output shafts. Thus when one of the guide rollers 6 is traveling up the inclined plane of the adjustable flexible semicircular helical track guide means 7 the opposite roller 6 of the pair of rollers is forced down on the opposite side of the cylinder by the under-track surface 28 of the return roller track 5.

As one roller 6 is about to enter the lower point of the variable or adjustable semicircular helical track guide means 7, as shown above the point of pivoting 8 in FIG. 4, the other roller 6 of the pair is about to come under the influence of the under-track surface of the roller guide track means 5, 180° away, as shown in the central portion of FIG. 4. A slight sloping off of the top track surface 39 of the positive stroke helical track means 7 is noted to start just beyond the 180° point and as the curved track surface continues it drops off very fast as shown at 49. Because of the small extension of surface 39 beyond the 180° point, there is a period of time wherein both rollers 6 are under the influence of the inclined helix of the track guide means 7. Dotted line 40 represents the path of travel of the rollers 6 when the track guide means 7 is at its most extended or highest position.

It should be noted that there is nothing above the rollers 6 to interfere with the rollers as they move up the inclined surface of the flexible helical roller track guide means 7. This is the positive power stroke of these guide rollers 6. They actually coast down the under-track surface 28 of the biased or return track guide means 5 and at this time the rollers perform no function other than to reposition themselves at the bottom of the inclined helical guide track means 7 as illustrated at either end of FIG. 4. Thus the start or pivot end 8 of the helical guide means 7 is the beginning of the positive drive, speed increase of the planetary gear transmission.

The post 9 at the movable end of the helical guide means 7 extending through slot 10 is attached to linkage or other suitable means to bring about axial movement of the pin 9 which may be operated, for example, by a temperature sensitive bimetal strip as illustrated in FIG. 8, or pressure operated bellows as illustrated in FIG. 9, or a servo motor, etc. to bring about the necessary adjustment of the helical guide means 7. As the post 9 is moved axially the helix angle changes in the fashion exemplified above in the form of a flat-faced coiled spring that is deflected axially.

As shown in FIG. 3, one roller 6 under the guide track means 5 is about to return to the pivot end 8 of the helical guide means 7 while the other is approaching the highest point, as selectively positioned, of the helix.

The rotary carriage or body 11 of this lineally variable speed device is mounted at opposite ends of the transmission on the antifrictional thrust carrying bearings 12 mounted respectively in the end plates or heads 2 and 3.

The input drive shaft 13 is integral or attached to the center of the carriage 11 at the input end of the transmission in any conventional manner. This is the main drive shaft that rotates the entire rotary carriage 11.

The shaft 14 is rotatably secured in transverse relation relative to the rotary axis of the transmission and passes through the same with its ends supported in openings 32 in the outer cylindrical walls of the carriage 11 through inner annular chamber 30 and through the central extension 31 of the shaft 13 in the axial center of the chamber. The shaft 14 is preferably fixed because it rotatably supports the two subassemblies 33, each consisting of a pinion 15 and a one-way or overrunning clutch 16 and a planet gear in the form of the beveled gear 17. The pinion 15 is fixed to one member of the clutch 16 and the beveled gear 17 is fixed to the other member of the clutch 16. As shown in FIG. 5 the upward movement of the gear rack 21 rotates the pinion 15 clockwise, as depicted by the arrow 34, on the shaft 14 and turns the integral clutch core 18 to roll the clutch engaging members in the form of the ball bearings 19 up the inclined faces or ramps 20 on the core 18 forcing them to grip the inner cylindrical surface 35 of the annular clutch sleeve 24, which sleeve is integral with the beveled planet gear 17, as shown in FIG. 5, and rotates the same in a clockwise direction. The upward movement of the rack 21 thus causes the sun gear 22 to rotate an additional amount over that of the speed of the input shaft 13 and the rotary carriage 11 thus increasing the resultant or total speed of the sun gear 22 and, thus, the output shaft 23.

Upon the biased return or downward movement of the gear rack 21 the core 18 is rotated counter clockwise in FIG. 5 and the ball bearings 19 stay in the low or pocket portion 36 of the ramps 20 and thus do not maintain any wedged contact against the inner cylindrical surface 35 of the sleeve 24, which leaves one integral beveled planet gear 17 free to rotate with the rotary movement of the carriage 11 while the opposite beveled planet gear 17 is caused to wedge the ball bearings 19 between the surface 35 and the ramp 20 and drive the sun gear 22 forward to rotate the output shaft 17 for one-half a rotary cycle. The clutch engaging members 19 may be spring biased to retain them normally in the pockets 36 at the front portion of the ramps 20 unless overcome by their own inertia when the cores 18 are rotated in a clockwise direction.

Each pinion 15 is meshed with the rack gear portion 37 of the slide rack 21 which is slidably retained in the aligned slots 25 in the carriage 11. These slots 25 and their respective racks 21 operate along longitudinal axes that are parallel with the rotary axis of the transmission and the major axis of the rotary carriage 11.

A compression spring 26 on each rack 21 may be provided as a biasing return means for the followers 6 in lieu of the under-track surface 28.

The antifriction followers 6 may be of any form or structure to engage the track means in the form of the arcuate track sections 4, 5 and 7 and their respective track surfaces 29, 28 and 39. The racks 21 may be plastic slide racks with plastic or steel wheels. It is preferable, however, that these rollers be steel and they be journaled on a stub shaft 38 at the bottom on the exterior side of the gear racks 21. As previously stated, when each roller 6 rides up the inclined helical guide means 7, the axial movement of the gear rack 21 rotates the pinion 15 and its respective planet gear 17 through its clutch 16 to drive the sun gear 22 faster than the rotary movement of the carriage 11 and its integral input shaft 13.

In the structure of FIG. 1 each roller 6 drives the sun gear 22 each half of every revolution in rotating the transmission input shaft clockwise and, if there is any inclination to the helical guide means track 7 to create axial positive reciprocal movement of the gear racks 21, the output shaft 23 is accordingly proportionally increased in rotational speed, for the sun gear 22 is secured to the output shaft 23.

If the movable guide track means 7 lies in the same transverse plane as the track 4, then the rollers 6 are retained in this position because the friction of the transmission and the load produces a natural bias to retain the gear racks 21 and the rollers 6 in the lowest most position, that is, within the transverse plane of the track 4.

There being no conversion of rotary movement to lineal movement, as continually found in the prior art, the action of the inclined helical guide track means 7 on the rollers 6 comprising this invention produces a linear speed increase through the gear racks 21. This is accomplished with the least number of parts, namely the adjustable helical guide track means 7, the follower roller 6 and gear rack 21 engaging a pinion 15 to drive through the clutch 16 and the planet gear 17 to rotate the sun gear 22. Thus, these seven elements produce the simple and improved positive drive lineally variable speed device comprising this invention.

The employment of gear racks to transfer linear motion developed at the path of travel from the employment of the helical track 7 is by far, not the only means for accomplishing such transfer of motion. An example of an alternate structure for converting vertical linear motion of gear rack 21 into rotary motion of pinion 15 is as follows.

As shown in FIGS. 6 and 7, instead of the pinion 15, the drum 15a is utilized. The rack 21 is replaced with a vertical bar 21a. Two thin flexible steel tapes or ribbons 50 and 51 are attached to the drum 15a at 52 on the drum and 53 on the bar 21a. Tape 50 is mounted to the drum 15a in a clockwise direction and the tape 51 is mounted to the drum 15a in a counterclockwise direction. As indicated, the extended end of each tape 50 and 51 is attached to the vertical bar 21a at 53 as shown in FIG. 6. Upward motion of the vertically mounted bar 21a caused by roller 6 moving up the helical surface 39 will pull tape 50 up rotating the drum 15a clockwise while wrapping tape 51 around the drum. A downward motion of the bar will pull tape 51 down while rolling tape 50 around the drum, thus rotating the drum 15a counterclockwise. Thus it can be seen that upward and downward motion of the bar 21a will cause a rotary motion of the drum. Since the tapes are always rotating on a drum of constant radius the motion of the bar and drum will always be of linear proportion. The drum 15a is attached to the clutch core 18 in the same manner as the pinion 15 is attached to the clutch core 18 as explained above.

To describe the operation of the transmission, the adjustable helical guide track means will first be considered in the down or lowermost position, that is, the helix angle is zero and is in the same place as track surface 29, as shown by the dotted lines in FIG. 4. As the input shaft is rotated the carriage 11 containing the gear racks, pinions, clutches and bevel gears in turn revolve, thus, turning the bevel gear 22 and the output shaft 23 by an equal rotational amount. The rollers 6 attached to the gear racks 21 are forced to move and rotate in a circular path around the inside of the cylinder 1 but do not move axially or vertically and therefore impart no motion to the gear rack or pinion. In this position of the adjustable helical guide track means, there is established a one to one ratio of input to output of the variable speed drive and, as previously indicated, the one to one drive is through the carriage 11 the shaft 14 and both planet gears 17 that are locked due to lack of axial movement of the gear racks 21 along the slots 25.

When the adjustable helical guide track means 7 is in the full upper or highest posititon, as shown in FIGS. 1 and 4, the variable speed drive will provide the maximum output speed versus input speed. As the input shaft is rotated the carriage 11 with its subassemblies 33 revolve and turn the output bevel sun gear 22 by the same amount plus additional rotation imparted by the respective bevel gears 17 through their associated clutch 16, pinion 15 and gear rack 21 as the latter moves upward due to its roller or follower 6 moving up the inclined surface 39 formed by the adjustable helical guide track means 7. This vertical motion of the respective followers 6 and gear racks 21 is continuous for 180° of rotation of the carriage 11 and then, continued rotation of the carriage causes the descending roller 6 to strike the fixed declining under-track surface 28 of return roller guide track 5, thus forcing the gear rack 21 down again to its lower most position (viewing FIG. 1) during the next 180° of rotation. On the down stroke of the gear rack 21, the pinion 15 is rotated counterclockwise and the clutch 16 slips because the ball bearings 17 are within the pockets 36, so that its respective bevel planet gear 17 will not be caused to rotate. The second roller 6 located 180° away from the first roller 6 is out of phase with the latter so that one roller is always, at any one period of a complete revolution of the carriage 11, moving up the helical guide track surface 39 while the other one is moving down between the track surfaces 28 and 29. This provides continuous advancement of the output bevel gear and shaft as defined by the equation stated earlier, herein. As shown in FIG. 4, the adjustable helical guide track means is slightly longer than 180° to assure that the second roller has made initial contact with the adjustable helix surface 39 and has started to lift its corresponding gear rack 21 before the first roller has left the track surface 39 and stopped its lifting motion of its gear rack 21. Both rollers lifting at the same time are not additive to the output but merely complement each other. For any selective position of the adjustable helical guide track means 7 between the two positions herein described within the slot 10, the rollers 6 lift the gear racks 21 proportionally and increase in a lineal manner the output rotational speed of the output shaft 23. The rollers so positioned in an intermediate position between the track surfaces 28 and 29 remain in this intermediate position until such a time that the rollers finally make contact with the under-track surface 28 somewhere intermediate of its full length and are finally returned to their original lowest starting position indicated at either end of FIG 4.

An alternate means of returning the rollers 6 to their original lowest starting position could be accomplished by replacing the return lower track 5 with an adjustable declining return roller guide track which has the same movable helical and angular displacement as the adjustable helix of the guide track means 7 but of the opposite hand, i.e., inclined in a direction opposite to guide track means 7 and on the inner surface of the cylindrical enclosure 1 opposite to that of the guide track means 7. This adjustable declining roller guide track may be positioned by means of connecting linkage with post 9 at the movable end of the helical guide track means 7. This alternate method of returning the rollers 6 would eliminate the effects of noise, wear, etc. caused by the rollers initially slamming or contacting on the under-track surface 28 of the fixed return track 5 during those times when the adjustable helical guide track means 7 is not in its fully extended position as depicted in FIGS. 1 and 4.

I claim:

1. Positive drive lineally variable speed device with axially disposed input and output shafts on a central rotary axis within an enclosure and connected through a revolving meshed sun and planet gear system, shaft means extending transversely of said rotary axis to rotatably support said sun meshed planet gears, unidirectional transmission coupling means on said shaft means one side of which is integral to said sun meshed planet gears, biased controlled lineal motion transfer means to impart uniform rotary motion to said unidirectional transmission coupling means, and adjustable track means mounted in said enclosure for engagement by said lineal motion transfer means to lineally control the transmission ratio of output to input speeds above a one to one ratio.

2. The lineally variable speed device of claim 1 characterized by a flexible semicircular member forming said track means for engagement by said lineal motion transfer means and extending for engagement by the latter at least beyond one of its terminal points of its 180° circumference.

3. The lineally variable speed device of claim 2 characterized by anchoring means to retain one end of said track means, and speed control means extending through the transmission enclosure to permit axial displacement of the other end of said track means to provide lineal control of said ratio of output to input speeds above a one to one ratio.

4. The lineally variable speed device of claim 3 characterized by responsive means to change the relative axial displacement of said speed control means to operate to variably displace said track means of said speed device in compensation for a variable change at its output to maintain a uniform continuous output speed.

5. The lineally variable speed device of claim 3 characterized by thermal responsive means to change the relative axial displacement of said speed control means to operate to variably displace said track means of said speed device in compensation for variable difference in temperature affecting the output thereof to maintain a uniform continuous output speed.

6. The lineally variable speed device of claim 3 characterized by fluid flow responsive means to change the relative axial displacement of said speed control means to operate to variably displace said track means of said speed device in compensation for a variable change of fluid flow affecting the output to input ratio to maintain a uniform continuous output speed.

7. The lineally variable speed device of claim 1 characterized by biased controlled reciprocating gear racks forming said lineal motion transfer means, an antifriction follower mounted on the end of each of said reciprocating gear racks, a plurality of perimetral segmentary arcuate members positioned around said axial input and output shafts forming said track means and consecutively engaged by said pair of followers and one of which is extended for engagement by said followers beyond at least one terminal point of its segmentary arc, and a complementary opposing perimentral segmentary arcuate guide track means intermediate each of said segmentary arcuate members engageable by said followers to consecutively bias the return of each of said reciprocating racks.

8. The lineally variable speed device of claim 7 characterized in that one of said segmentary arcuate members is a flexible axially displaceable track guide means pivoted adjacent one end thereof and movable longitudinally relative to said speed device enclosure to form a helical track surface to guide said followers to adjustably but lineally control the transmission ratio of output to input speeds above a one to one ratio.

9. The lineally variable speed device of claim 1 characterized by biased controlled reciprocating gear racks forming said lineal motion transfer means, an antifriction follower mounted on the end of each of said reciprocating gear racks, a plurality of perimetral segmentary arcuate members forming said track means engaged by consecutive of said pair of followers and comprising a positive stroke track means and a biased return stroke track means, the latter overlapping a portion of said positive stroke track means.

10. The lineally variable speed device of claim 9 characterized by means to axially vary the inclination of a section of said positive stroke track means, a fixed biasing return stroke track means, and a fixed arcuate track section means for alignment with said positive stroke track means when the latter lies in the same transverse plane of the former.

11. The lineally variable speed device of claim 10 characterized by an overlap portion at the ends of said positive stroke track means and said fixed biased return stroke track means to maintain continuous and uninterrupted positive stroke action of said gear racks by the location of at least one gear rack follower of the pair positioned on said positive stroke track means.

12. The lineally variable speed device of claim 10 characterized by said biased return stroke track means overlapping a portion of said positive stroke track section capable of having a variable inclination.

13. The power transmission of claim 9 characterized by an antifriction journaled roller comprising said antifriction followers and secured to said gear racks to engage said track means with clearance provided between said positive stroke track means and any portion of said biasing return track means.

14. The power transmission of claim 1 characterized by a plurality of perimetral segmentary arcuate members forming a positive stroke track means, and pressure biasing means effective on said lineal motion transfer means to bias the return stroke of the latter.

15. The power transmission of claim 1 characterized by means to bias the return of said followers to said positive stroke track means.

References Cited

UNITED STATES PATENTS

| | | | |
|---|---|---|---|
| 2,126,294 | 8/1938 | Timmermann | 74—679 |
| 2,387,401 | 10/1945 | Marco | 74—679 |
| 3,380,564 | 4/1968 | Beurer | 74—679X |

LEONARD H. GERIN, Primary Examiner

U.S. Cl. X.R.

74—394

UNITED STATES PATENT OFFICE
CERTIFICATE OF CORRECTION

Patent No. 3,561,290　　　　　　　　　　Dated February 9, 1971

Inventor(s)　George W. Ruck

It is certified that error appears in the above-identified patent and that said Letters Patent are hereby corrected as shown below:

Column 7, line 65, and Column 8, lines 31 and 53, "biased each occurrence, should read -- bias --. Column 8, lines 57 and 58, "by consecutive of" should read -- consecutively by --; line 58, cancel "pair of"; line 59, "biased" should read -- biasing --; line 74, cancel "of the pair". Column 9, lines 5 and 11, and column 10, line 1, "power transmission", each occurrence should read -- lineally variable speed device --. Column 10, line 2, "followers" should read -- lineal motion transfer means --.

Signed and sealed this 7th day of September 1971.

(SEAL)
Attest:

EDWARD M. FLETCHER, JR.　　　　　　ROBERT GOTTSCHLAK
Attesting Officer　　　　　　　　　　Acting Commissioner of Patents